(12) United States Patent
Zadorojniy et al.

(10) Patent No.: US 11,281,734 B2
(45) Date of Patent: Mar. 22, 2022

(54) PERSONALIZED RECOMMENDER WITH LIMITED DATA AVAILABILITY

(71) Applicant: International Business Machines Corporation, Armonk, NY (US)

(72) Inventors: Alexander Zadorojniy, Haifa (IL); Sergey Voldman, Kiryat Tivon (IL); Nir Mashkif, Ein Carmel (IL)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 16/502,048

(22) Filed: Jul. 3, 2019

(65) Prior Publication Data
US 2021/0004421 A1 Jan. 7, 2021

(51) Int. Cl.
*G06F 16/00* (2019.01)
*G06F 16/9535* (2019.01)
*G06F 16/9536* (2019.01)
*G06K 9/62* (2022.01)
*G06Q 30/02* (2012.01)
*G06Q 30/06* (2012.01)

(52) U.S. Cl.
CPC ...... *G06F 16/9535* (2019.01); *G06F 16/9536* (2019.01); *G06K 9/6264* (2013.01); *G06Q 30/0271* (2013.01); *G06Q 30/0631* (2013.01)

(58) Field of Classification Search
CPC .......... G06N 20/00; G06N 5/04; G06N 5/022; G06N 5/046; G06N 3/006; G06N 7/005; G06N 5/003; G06N 3/0454; G06N 3/0472; G06N 5/043; G06N 3/0445; G06N 3/08; G06N 3/084; G06N 3/088; G06N 3/126; G06N 5/025; G06N 5/045; G06F 17/18; G06F 16/144; G06F 16/211; G06F 16/2322; G06F 16/2358; G06F 16/254; G06F 16/435; G06F 3/0428; G06F 3/0482; G06F 3/0649; G06F 40/30; G06F 8/10; G06F 8/34; G06F 8/433; G06F 8/4452; G06F 9/5061; G06F 16/3329; G06F 16/9535; G06F 16/9536; G06F 21/554; G06F 21/56; G06F 21/62; G06F 3/167; G06F 8/77
See application file for complete search history.

(56) References Cited

U.S. PATENT DOCUMENTS

| 10,909,450 | B2* | 2/2021 | Chen ........................ G06N 3/08 |
| 2016/0180402 | A1 | 6/2016 | Sabah et al. |
| 2017/0083965 | A1 | 3/2017 | Sun |
| 2018/0012242 | A1 | 1/2018 | Phan |
| 2018/0165603 | A1* | 6/2018 | Van Seijen ............ G06N 3/084 |
| 2019/0139092 | A1* | 5/2019 | Nomula .............. G06Q 30/0255 |
| 2020/0204862 | A1* | 6/2020 | Miller .................... G06N 3/088 |

FOREIGN PATENT DOCUMENTS

WO 2017193323 A1 11/2017

* cited by examiner

*Primary Examiner* — Yicun Wu
(74) *Attorney, Agent, or Firm* — Barry D. Blount (57) ABSTRACT

In some examples, a system for generating personalized recommendation includes a processor that can perform an initial training for a deep reinforcement learning (DRL) model using domain knowledge, available users data, and an items list. The processor also inputs users data and an items list to the trained DRL model to generate an initial list of recommended items. The processor also inputs the initial list of recommended items and a user profile to a content-based filter to generate a final list of recommendations for a target user.

21 Claims, 6 Drawing Sheets

PERSONALIZED RECOMMENDER WITH LIMITED DATA AVAILABILITY

BACKGROUND

The present disclosure relates to techniques for generating recommendations using Deep Reinforcement Learning and content-based filtering.

SUMMARY

According to an embodiment described herein, a system for generating personalized recommendation includes a processor that can perform an initial training for a deep reinforcement learning (DRL) model using domain knowledge and available users' data and an items list. The processor also inputs users data and an items list to the trained DRL model to generate an initial list of recommended items. The processor also inputs the initial list of recommended items and a user profile to a content-based filter to generate a final list of recommendations for a target user.

In some embodiments, a method of generating personalized recommendations includes performing an initial training for a deep reinforcement learning (DRL) model using domain knowledge and available users' data and an items list, inputting users data and an items list to the trained DRL model to generate an initial list of recommended items, and inputting the initial list of recommended items and a user profile to a content-based filter to generate a final list of recommendations for a target user.

In yet another embodiment, a computer program product for generating personalized recommendations can include a computer readable storage medium having program instructions embodied therewith, wherein the computer readable storage medium is not a transitory signal per se. The program instructions can be executable by a processor to cause the processor to perform an initial training for a deep reinforcement learning (DRL) model using domain knowledge and available users' data and an items list, input users data and an items list to the trained DRL model to generate an initial list of recommended items, and input the initial list of recommended items and a user profile to a content-based filter to generate a final list of recommendations for a target user.

DETAILED DESCRIPTION

The present disclosure describes techniques for using deep reinforced learning and content-based filtering to generate recommendations. A recommendation as used herein is the identification of one or more item that may be of interest to a particular person. For example, a media platform may generate recommendations to present recommended content to its users. An online retailer may also generate recommendations to present to its users products that the user is more likely to purchase. Various Websites may also generate recommendations to identify advertisements that may be useful for attracting user interest. The goal of such recommendations is to present items that are likely to be of interest to the user.

Machine learning algorithms can provide useful recommendations if there is sufficient information about the interests of a user or a large group of users. However, when there is little or data available, typical machine learning techniques may be not suitable for generating useful recommendations. The present disclosure described techniques for generating useful information when large amounts of user interest data are not available.

Figure 1:
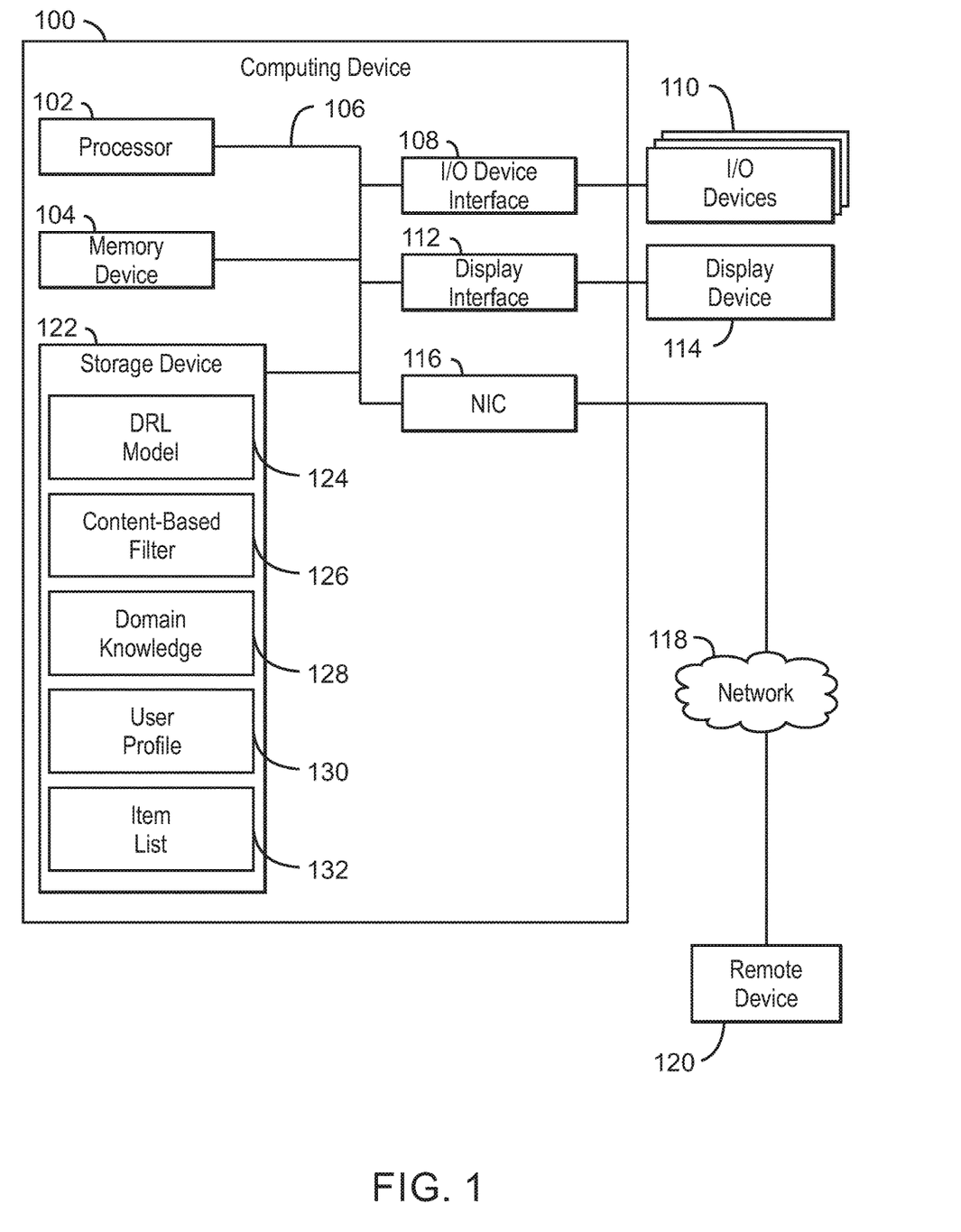
FIG. 1 depicts a block diagram of an example computing system that can generate personalized recommendations according to an embodiment described herein.

With reference now to FIG. 1, an example computing device is depicted that can generate personalized recommendations. The computing device 100 may be for example, a server, desktop computer, laptop computer, tablet computer, or smartphone. In some examples, the computing device 100 may be a cloud computing node. The computing device 100 may be described in the general context of computer system executable instructions, such as program modules, being executed by a computer system. Generally, program modules may include routines, programs, objects, components, logic, data structures, and so on that perform particular tasks or implement particular abstract data types. The computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory device 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote device 120 may connect to the computing device 100 through the network 118.

In some examples, the processor 102 can be linked through the system interconnect 106 to the storage device 122, which can include a deep reinforcement learning (DRL) model 124, content-based filter 126, domain knowledge 128, user profiles 130, and item list 132. The DRL model 124 uses a deep neural network in combination with reinforcement learning techniques to generate recommendations. The DRL model 124 may be trained using domain knowledge 128 which represent the interest of a large number of users. The content-based filter is used to personalize the recommendation to a particular target user based the user's interests as captured by the user profile 130.

The item list is a list of all or a sub-set of the potential items that can be recommended. The items in the item list will vary depending on the particular implementation. For example, in the case of a streaming media platform, the items may be media files, including audio files, video files, audio/visual files. For example, the media files may include music, music videos, movies, video clips, television series, and others. In some embodiments, the items may be retail products or services, advertisements, and others. Each item may be associated with a set of features that describe characteristics of the items.

There may be several techniques by which the DRL model 124 may be used in combination with the content-based filter to generate personalized recommendations. Some example embodiments of the techniques are described below in relation to FIGS. 2 and 3.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the DRL model 124 and content-based filter 126 are partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the recommendation system are implemented with logic, wherein the logic, as referred to herein, can include any suitable hardware (e.g., a processor, among others), software (e.g., an application, among others), firmware, or any suitable combination of hardware, software, and firmware.

Figure 2:
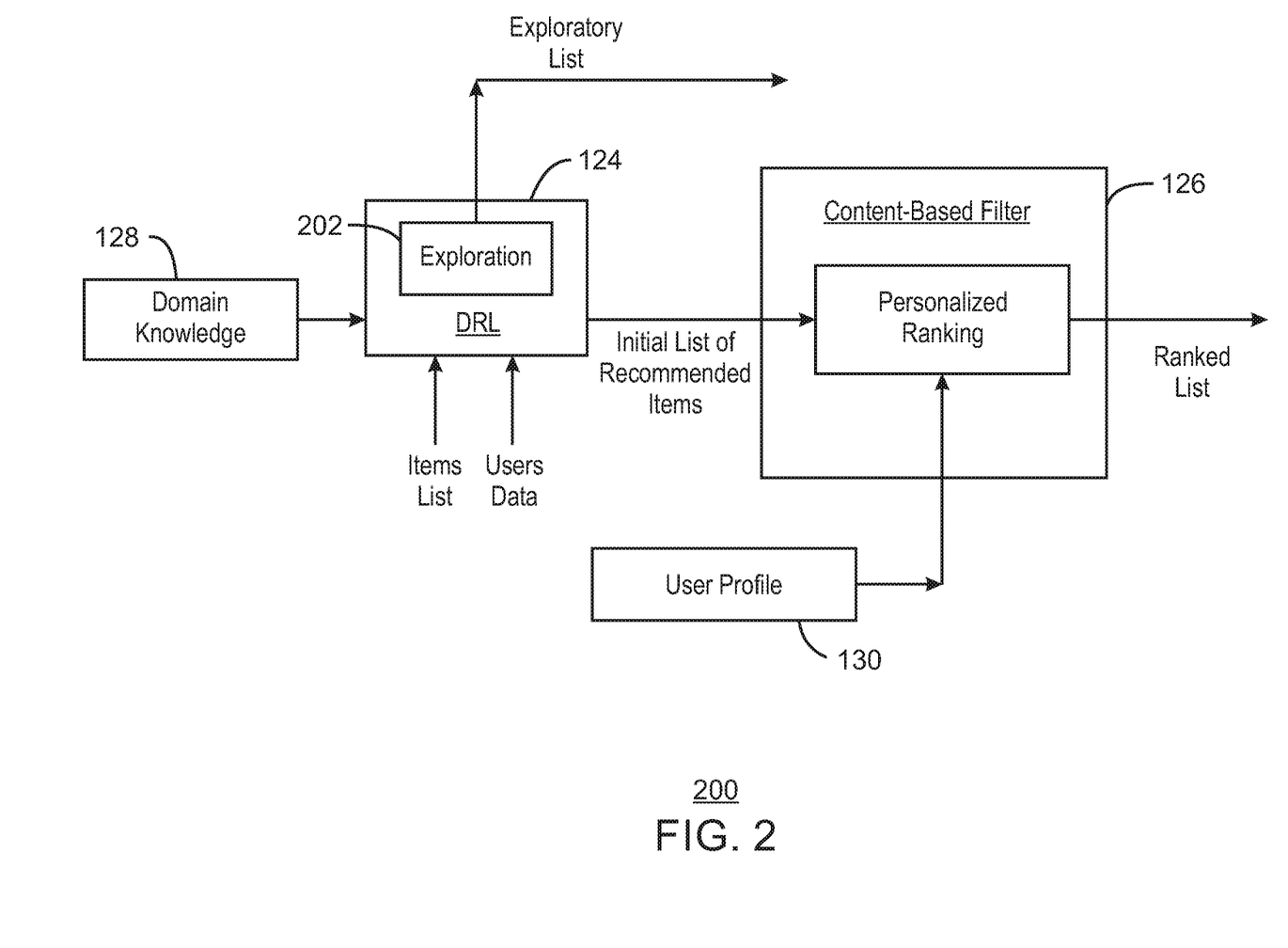
FIG. 2 is a block diagram showing an example recommendation system that generates recommendations using a deep reinforcement learning (DRL) model and content-based filter.

FIG. 2 is a block diagram showing an example recommendation system that generates recommendations using a deep reinforcement learning (DRL) model and content-based filter. The recommendation system 200 may be implemented by the example computing system shown in FIG. 1. In this embodiment, the process performed by the recommendation system begins with the initial training of the DRL model 124 using domain knowledge 202. The DRL model 124 uses deep neural network in combination with a reinforcement learning algorithm. The deep neural network is an artificial neural network that includes an input layer, an output layer, and two or more internal layers between the input and output layers. Each layer may include any suitable number of nodes and each node of a layer may be connected to each of the nodes of the preceding layer and successive layer. Connections between the nodes may be referred to as edges. The nodes and the edges may be associated with weights that are adjusted as training progresses. Prior to initialization, the weights may be random or assigned arbitrary values.

The input to the trained neural network may be referred to as a state and the output of the neural network may be referred to as an action. The DRL model 124 identifies a state-action combination that tends to provide the highest expected reward. In the present disclosure, the state is the profile of a particular person describing the personal preferences of that person, and the action is a list of one more initial recommendations. The neural network models the interests of a large number of users in such a way that inputting the state (a specific person's preferences) will yield recommendations that are likely to appear to that particular person.

The initial training of the DRL model 124 may be performed using a large set of domain knowledge records that describe user preferences of a large number of people. The domain knowledge 202 may include a list of items and a rating for each item in the list. For example, if the list of items is a list of products or services, the rating may be an average of a number of user reviews for that product or service that may be collected by a Website. If the list is a list of media files, such as songs or video clips, the rating may be computed based on a number of times that the item has been viewed, or a number of likes or dislikes that a media file has received.

Each item in the list of items may be represented by a feature vector, which is used as the input to the neural network. The feature vector may be a string of characters or numbers that represent characteristics of the item, such as price, product type, and others. Any characteristic of the item may be represented as a feature in the feature vector. For example, if the item is a media file, the characteristics that may be included as features in the feature vector may include, the type of media, such whether it is a movie, a music video, a show series, movie genre, music genre, producer of the media, actors or performers, movie director, and many others. If the item is a retail product, the characteristics may include price, manufacturer, specifications, and others. If the item is a service such as a restaurant, the characteristics may include price, geographical location, type of food, and others. The feature vector may include any suitable number of characteristics including those listed above and others.

During the initial training, the feature vector of some or all of the items may be input to the neural network to compute an output. The output is compared to the rating to compute a loss function, which represents the difference between the output of the neural network and the rating. A training algorithm may be used to adjust the weights of the neural network so that the loss function (e.g., the difference between the output of the neural network and the ratings) is minimized. Any suitable DRL training algorithm may be used to adjust the weights, including Q-learning, policy-gradient, and others.

The resulting trained neural network describes the importance of each of the features in determining the interests of users. At this stage, the DRL model 124 has been trained using the domain knowledge of several users. The trained DRL model 124 may then be used to generate recommendations for a target user. As used herein, the target user is the person to whom the recommendations are intended to appeal. To generate a recommendation, the items list and the users data for the several users are input to the trained DRL model 124. The target list is the list of all or part of the potential items that could be recommended. For example, if the items are media files, the potential items may be a list of all of the items in a system's database. The user data includes data about the target user's preferences.

The neural network receives the items list and the users data and outputs a recommendations list that includes the ranked items with the corresponding scores. The objective of the reinforcement learning algorithm is to identify a combination/rank of items that maximize the objective/loss function, which indicates that higher scored items have a higher likelihood of appealing to the user.

The items output by the DRL model 124 may be referred to as an initial list of recommended items. This initial list of recommended items is not yet personalized to the specific user because the initial DRL model is trained using general domain knowledge rather than knowledge about the specific user's interests. The initial list of recommended items may include any suitable number of items. Each item in the list of recommended items may also include a list of attributes specific to each item. The attributes may be any of the attributes described above in relation to the training of the neural network. The initial list of recommended items is then input to the content-based filter for personalized ranking of the short list of initial recommendations.

The content-based filter receives the initial list of recommended items and the user's user profile 130 and further filters the list based on the target user's personal interests. The user profile 130 may be any suitable configuration for identifying the interests of a user. In some examples, the user profile 130 may include a list of features, which may be ranked according the level of user preference. For example, the user profile 130 may include a list of movie genres and a preference value that indicates the relative level of interest in each of the movie genres. The user profile 130 may also include demographic information, such as age, geographical location, and others. The user profile 130 may then be compared to the attributes of the items in the initial list of recommended items to rank the items and possibly eliminate some items from the list to generate a smaller list of final recommended items. For example, if the list of initial recommended items relates to movies, and the user profile 130 indicates a lack of interest in a particular genre, those items may be eliminated from the list or given a low ranking. Conversely, if the user profile 130 indicates a high level of interest in a particular genre, those items in the initial list may be given a higher ranking. Additionally, the ranking of each item may be increased based on the number of intersections between item attributes and user profile features. As used herein the term intersection refers to an item attribute that corresponds with a feature of the user profile 130 that indicates a significant level of interest. For example, the user profile 130 may indicate a high level of interest in movies from a specific genre, and movies with specific actors, and movies made by particular movie producers. Those items in the initial list of recommendations that have a higher number of attributes corresponding to highly ranked features of the user profile 130 will tend to be ranked higher compared to items in the initial list that have fewer or no intersections.

The resulting ranked list of final recommendations may be then sent to the user for display. In some embodiments, such as in a streaming media service, the recommended items may be displayed in a menu identified as recommended items. Each item in the display may also include the rank assigned to each item to indicate to the user the estimated probability the recommendation reflects the user's actual interests. In some embodiments, such as an advertising environment, a Web page or app may be populated with advertisements corresponding to one or more of the highest ranked items. In an e-commerce marketplace, for example, on an e-commerce website, the highest ranked items may be displayed as a list of products or services available for purchase.

The user profile 130 may be updated as more data about the user's interests become available as indicated by user activity such as the user's viewing activity, purchase activity, and others. For example, in the case of a streaming media service, the user selection of a specific media such as a movie my cause the user profile 130 to be updated to indicate the user's interest in the attributes associated with that media file. In some embodiments, the user profile may be updated based on user rankings. For example, the user may visit a particular restaurant or purchase a particular product and then submit a review of the restaurant or product at a Website. The user's review ranking may be used to increase or decrease the corresponding features in the user profile that relate to attributes of the restaurant or product. Over time, as more is learned about the user's preferences, the user profile 130 will updated and more accurate recommendations can be made.

In some embodiments, the recommendation system may include an exploration module 202 that can be used to gather more information about potential user interests that may not be included in the user profile 130. The exploration module 202 may select items from the short list of initial recommendations and insert the randomly selected items into the final list of recommended items pursuant to an exploration policy. For example, the exploration policy may dictate that items be selected randomly from the short list of initial recommendations. Other exploration policies are also possible. In this way, user feedback can be collected for items that may be of interest to the user, but that the system did not previously have visibility for. For example, a randomly selected item may be a movie within a genre that is not indicated by the user profile. If the user selects this randomly selected item, the user profile 130 may be updated to indicate a level of interest in the new movie genre. In this way, the user profile 130 can be expanded to include user interests that were not previously known and would not have otherwise been recommended by the content-based filter 126.

Figure 3:
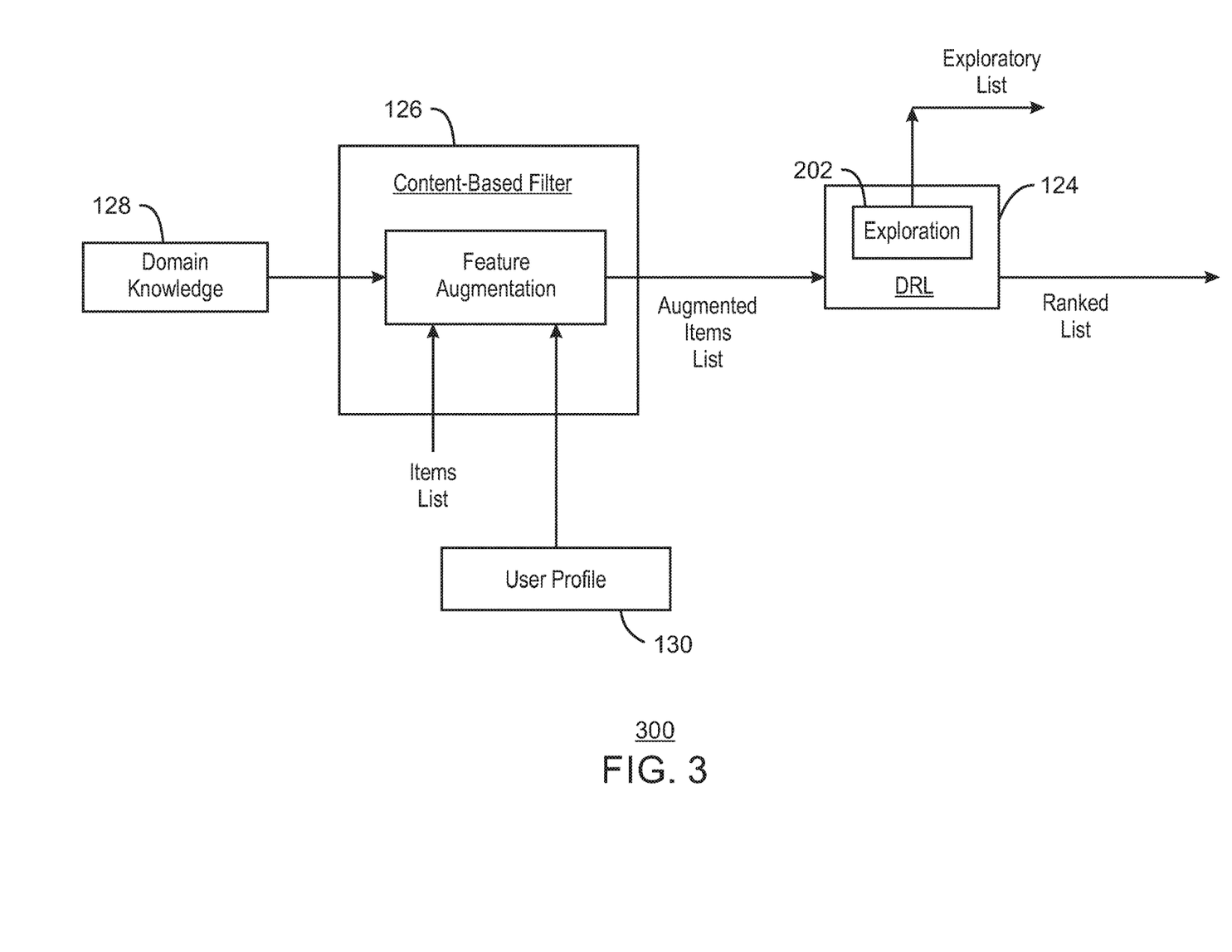
FIG. 3 is a block diagram showing another example recommendation system that generates recommendations using a deep reinforcement learning (DRL) model and content-based filter.

FIG. 3 is a block diagram showing another example recommendation system 300 that generates recommendations using a deep reinforcement learning (DRL) model and content-based filter. The recommendation system may be implemented by the example computing system shown in FIG. 1. In this embodiment, the process performed by the recommendation system begins with the augmentation of the domain knowledge 128 using the content-based filter 126. The content-based filter 126 may be used to obtain scores for each item in the list of items based on preference data from the user profile 130. The scores may be added to the feature vector for each of the items.

The augmented list of items may then be used for the initial training of the DRL model 124, which may proceed as described above in relation to FIG. 2. The trained DRL model 124 may then be used to make personalized recommendations for the target user. The input to the trained DRL model 124 is the list of items and the output of the DRL model 124 is the ranked list of final recommendations. The final recommendations may be displayed to the user as described above in relation to FIG. 1. As described above, the user profile may be updated based on user activity indicative of the user's interests, and the exploration module 202 that can be used to gather more information about potential user interests that may not be included in the user profile 130 by randomly selecting items from the list of potential items to present to the user.

The recommendation systems described above in relation to FIGS. 2 and 3 are examples of possible implementations of the present techniques. Other implementations are also possible. For example, the recommendation system can include a hybrid of the systems described in relation to FIGS. 2 and 3. In such a hybrid system, the recommendation system of FIG. 2 could be used to generate a first list of recommendations, the recommendation system of FIG. 3 could be used to generate a second list of recommendations, and the final list of recommendations can be selected from among the highest ranked items in both the first and second lists combined. Other embodiments are also possible.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
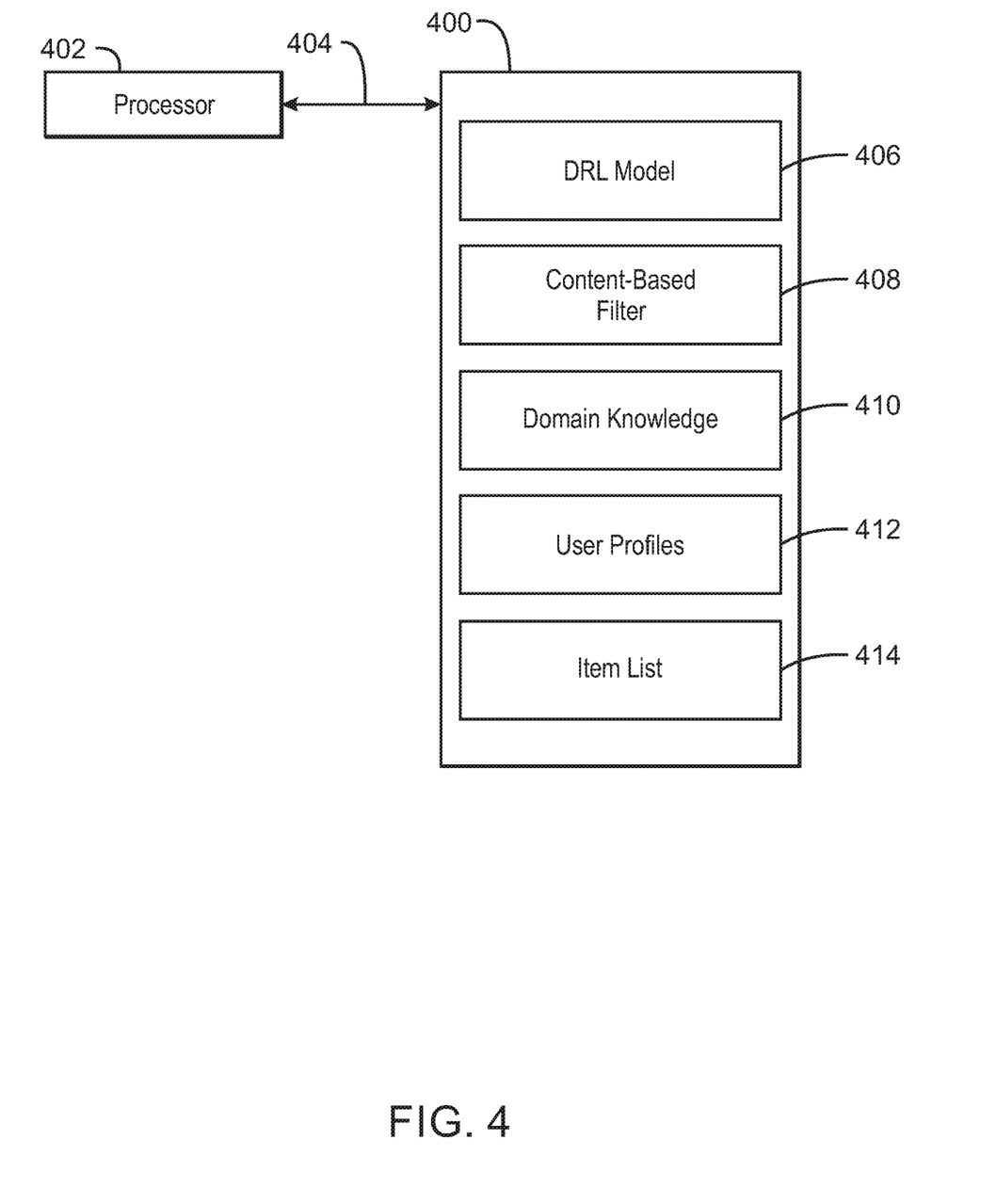
FIG. 4 is a tangible, non-transitory computer-readable medium that can generate personalized recommendations according to an embodiment described herein.

Referring now to FIG. 4, a block diagram is depicted of an example of a tangible, non-transitory computer-readable medium that can execute instructions to generate recommendations. The tangible, non-transitory, computer-readable medium 400 may be accessed by a processor 402 over a computer interconnect 404.

Furthermore, the tangible, non-transitory, computer-readable medium 400 may include data and code to direct the processor 402 to perform the operations of the described techniques. For example, computer-readable medium 400 may include a DRL model 406 and content-based filter 408 used to generate recommendation as described above. The computer-readable medium 400 may include domain knowledge 410, which is used to train the DRL model during an initial training stage. The DRL model may also be trained using the user profiles 412. User specific recommendations may be computed by the trained DRL model using a specific one of the user profiles 412. The final list of recommendations may be selected from among the list of items, item list 414, which represent all of the potential items that can be recommended by the recommendation system.

It is to be understood that any number of additional software components not shown in FIG. 4 may be included within the tangible, non-transitory, computer-readable medium 400, depending on the specific application. Furthermore, fewer software components than those shown in FIG. 4 can be included in the tangible, non-transitory, computer-readable medium 400.

Figure 5:
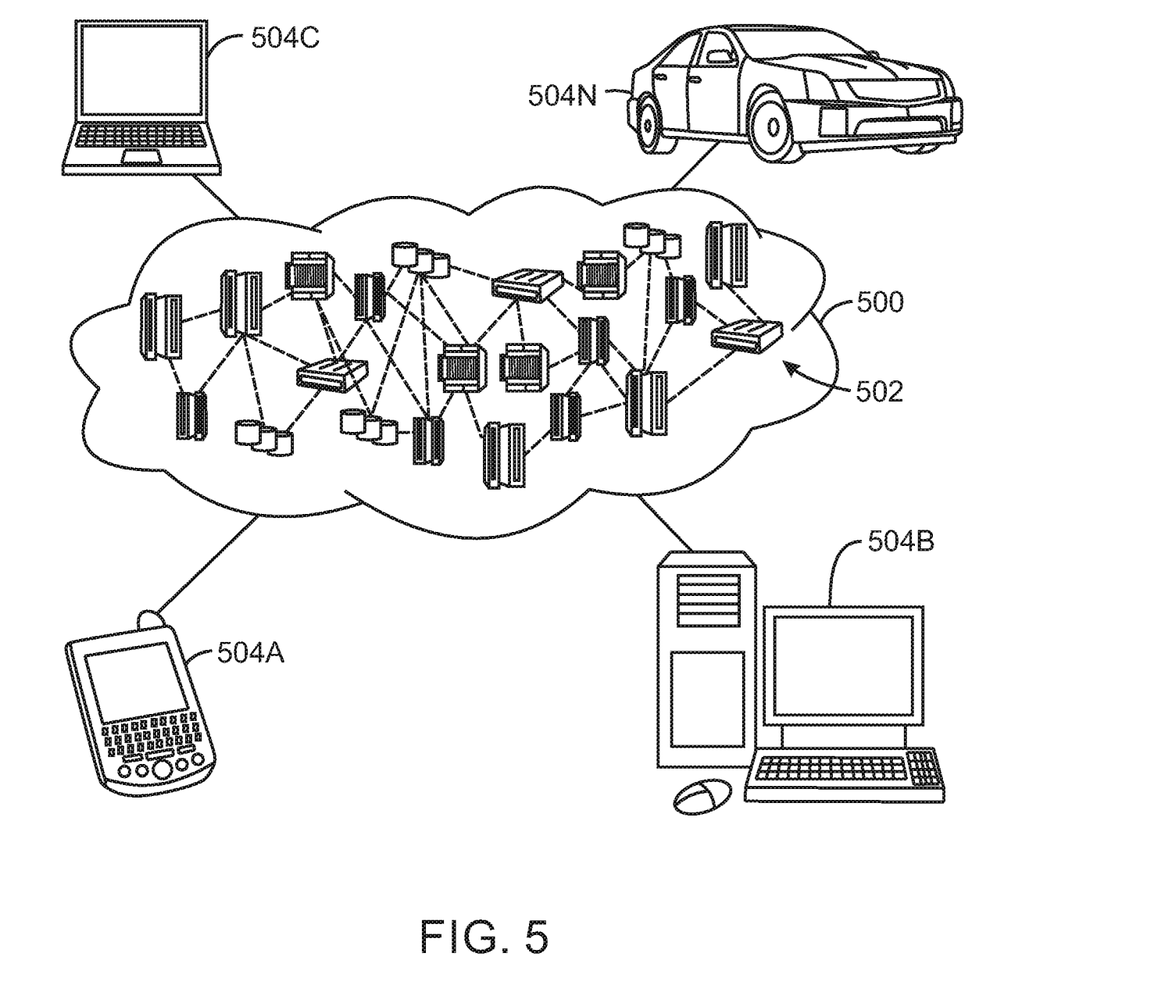
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. The cloud computing nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that the cloud computing nodes 502 and cloud computing environment 500 can communicate with any type of computerized device over any type of network and/or network addressable connection (e.g., using a web browser).

Figure 6:
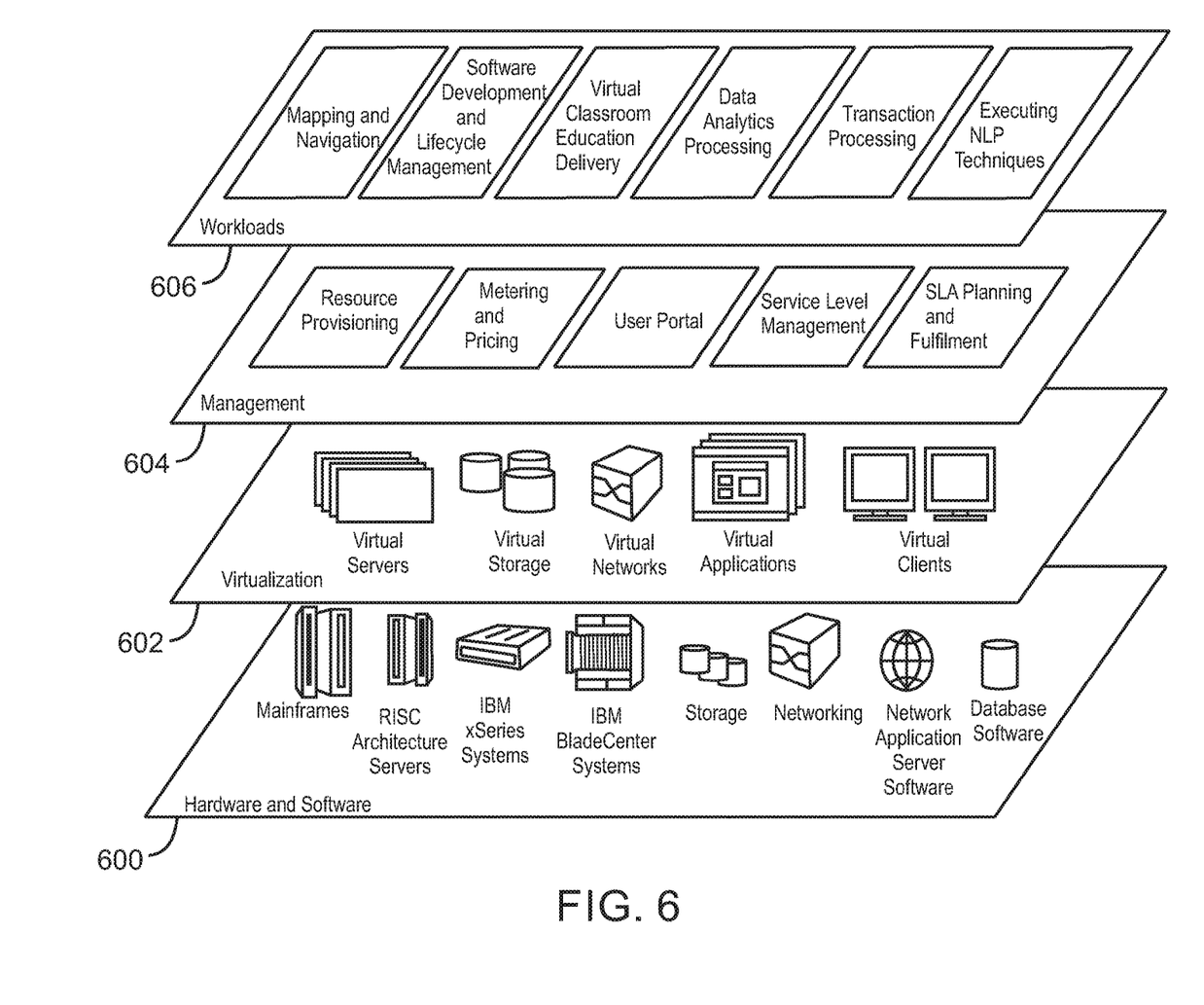
FIG. 6 depicts a set of functional abstraction layers provided by a cloud computing environment according to an embodiment described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and executing natural language processing (NLP) techniques.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for generating personalized recommendations comprising:
a processor to:
perform an initial training for a deep reinforcement learning (DRL) model using domain knowledge comprising domain knowledge records that describe user preferences of a plurality of people;
input users data of the plurality of people and an items list into the trained DRL model to generate an initial list of recommended items from the items list;
input the initial list of recommended items from the trained DRL model and a user profile into a content-based filter to generate a final list of recommendations for a target user;
modify the generated final list of recommendations to include an additional item selected from the initial list of recommended items generated by the trained DRL; and
send the modified final list of recommendations to the target user for display.

2. The system of claim 1, wherein the domain knowledge comprises user reviews or other actions that indicate user preferences of the plurality of people corresponding to items in the items list.

3. The system of claim 1, wherein the user profile comprises a list of features, wherein each feature in the list of features comprises a value that indicates a level of user preference of the target user corresponding with the feature.

4. The system of claim 1, wherein each item in the item list comprises a feature vector that describes attributes of the item.

5. The system of claim 1, wherein the final list of recommendations is ranked according to a probability that each item in the final list of recommendations will be of interest to the target user.

6. The system of claim 1, wherein the processor is to insert random items from the initial list of recommended items into the modified final list of recommendations pursuant to an exploration policy.

7. The system of claim 1, wherein the processor is to update the user profile based on a selection by the target user of one or more of the modified final list of recommendations.

8. The system of claim 1, wherein the items list comprises a list of media files stored by a streaming media service.

9. The system of claim 1, wherein the items list comprises a list of products available for purchase from an e-commerce Website.

10. The system of claim 1, wherein the items list comprises a list of advertisements.

11. A method of generating personalized recommendations comprising:
performing an initial training for a deep reinforcement learning (DRL) model using domain knowledge comprising domain knowledge records that describe user preferences of a plurality of people;
inputting users data of the plurality of people and an items list into the trained DRL model to generate an initial list of recommended items from the items list;
inputting the initial list of recommended items from the trained DRL model and a user profile into a content-based filter to generate a final list of recommendations for a target user; and
modifying the generated final list of recommendations to include an additional item selected from the initial list of recommended items generated by the trained DRL.

12. The method of claim 11, wherein the domain knowledge comprises user reviews or other actions that indicate user preferences of the plurality of people corresponding to items in the items list.

13. The method of claim 11, wherein the user profile comprises a list of features, wherein each feature in the list of features comprises a value that indicates a level of user interest of the target user corresponding with the feature.

14. The method of claim 11, wherein each item in the item list comprises a feature vector that describes attributes of the item.

15. The method of claim 11, comprising ranking the final list of recommendations according to a probability that each item in the final list of recommendations will be of interest to the target user.

16. The method of claim 11, comprising inserting random items from the initial list of recommended items into the modified final list of recommendations pursuant to an exploration policy.

17. The method of claim 11, comprising updating the user profile based on a selection by the target user of one or more of the modified final list of recommendations.

18. The method of claim 11, wherein the items list comprises a list of media files stored by a streaming media service.

19. The method of claim 11, wherein the items list comprises a list of products available for purchase from an e-commerce Website.

20. A computer program product for generating personalized recommendations comprising a computer readable storage medium having program instructions embodied therewith, wherein the computer readable storage medium is not a transitory signal per se, and wherein the program instructions are executable by a processor to cause the processor to:
perform an initial training for a deep reinforcement learning (DRL) model using domain knowledge comprising domain knowledge records that describe user preferences of a plurality of people;
input users data of the plurality of people and an items list into the trained DRL model to generate an initial list of recommended items from the items list;
input the initial list of recommended items from the trained DRL model and a user profile into a content-based filter to generate a final list of recommendations for a target user; and
modify the generated final list of recommendations to include an additional item selected from the initial list of recommended items generated by the trained DRL.

21. The computer program product of claim 20, wherein the additional item is selected based on an exploration policy.

* * * * *